2,948,706

LIGHT-SENSITIVE HIGH MOLECULAR COMPOUNDS

Wolf-Dietrich Schellenberg, Leverkusen, and Herbert Bartl, Koln-Stammheim, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware No Drawing. Filed Dec. 18, 1956, Ser. No. 628,991

Claims priority, application Germany Dec. 19, 1955

6 Claims. (Cl. 260—66)

This invention relates to light-sensitive high molecular compounds. More particularly, the invention is concerned with light-sensitive high molecular compounds formed from high molecular weight compounds and unsaturated ketones, a method for producing the new light-sensitive high molecular compounds and certain applications of the same.

It is an object of the present invention to provide light-sensitive high molecular compounds which are eminently suitable for the preparation of difficult reproductions. Another object is to provide a process for producing these new light-sensitive high molecular compounds from high molecular weight compounds and unsaturated ketones. A further object is to provide methods of converting these light-sensitive high molecular compounds into cross-linked insoluble products. A further object is to provide a new reproduction technique using these light-sensitive high molecular compounds. Still further objects will appear hereinafter.

It has now been found in accordance with the present invention that high molecular compounds which can be cross-linked and thus rendered insoluble by the action of light can be obtained by reacting a compound of high molecular weight with an unsaturated ketone comprising two aromatic ring systems connected to each other by at least one keto group and at least one ethylene group if one of the reactants contains at least one group containing reactive hydrogen and the other reactant contains at least one group capable of reacting with reactive hydrogen.

The term "group containing reactive hydrogen" as used in the instant specification and claims designates all groups containing hydrogen that can be determined by the Zerewitinoff method. Representative examples of such groups include carboxyl, hydroxyl, mercapto, primary and secondary amino and also carboxylic acid amide, carboxylic acid imide or sulfonamide groups. Illustrative examples of groups capable of reacting with reactive hydrogen include isocyanate, isothiocyanate, carboxylic acid halide, epoxide and cyclic dicarboxylic acid anhydride groups.

Among the compounds of high molecular weight which can be used in the practice of the invention are natural and synthetic substances. Examples of suitable natural substances include gelatine, cellulose and cellulose derivatives, such as cellulose esters. As examples of suitable synthetic substances, there may be mentioned polyesters containing free hydroxyl and/or carboxyl groups, obtainable in known manner from polyhydric alcohols and polybasic acids or acid anhydrides. Another group of synthetic substances which may be used in the practice of the invention is made up by polyaddition compounds of high molecular weight which contain free isocyanate groups or free hydroxyl groups and which are prepared by reacting a polyhydric alcohol, an hydroxyl polyester or an hydroxyl polyether with a polyisocyanate. As the compound of high molecular weight, there may also be utilized polymerization products, such as those obtainable by polymerizing acrylic acid, methacrylic acid, allyl glycide ether or polymerizable compounds which contain free isocyanate groups, for example acrylic ester isocyanate. Organic polyvinyl esters which are saponified to a greater or lesser degree can also be employed. It is obvious that also copolymers of the above compounds or of maleic anhydride or fumaric acid, with any desired other component can be used, styrene, acrylic and methacrylic esters and vinyl esters being particularly suitable as copolymerization components.

The unsaturated ketones which are used according to the invention and which consist of two ring systems of aromatic nature connected to one another by at least one keto group and at least one ethylene group can contain the active groups in both ring systems. Preferably, however, the unsaturated ketone should contain only one such active group. The ketones can of course also carry other substituents of any desired nature.

In the presence of several active groups in the unsaturated ketone, the reaction conditions should be so chosen, as to prevent a premature cross-linking and thus to prevent the reaction products from becoming insoluble.

Suitable unsaturated ketones are for example p-hydroxy-benzal acetophenone, p-hydroxy-benzal cinnamal-acetone, benzal-acetophenone-p-isocyanate, 1,2-dibenzoyl ethylene, m-amino-benzal-acetophenone and m,m'-diisocyanato-benzal acetophenone. These ketones can be prepared by the conventional method, for example by aldol condensation.

In a preferred embodiment of the invention, light-sensitive high molecular weight compounds are prepared by reacting a compound of high molecular weight that contains a plurality of isocyanato groups with an unsaturated ketone that has an hydroxyl group attached to one of the two aromatic ring systems or by reacting a compound of high molecular weight that contains a plurality of hydroxyl groups with an unsaturated ketone that has an isocyanato group attached to one of the two aromatic ring systems. In this manner, there are obtained reaction products containing urethane linkages. As an example of a suitable combination of reactants, there may be mentioned the copolymer of methacrylic cyclohexyl ester and acrylic ester isocyanate as the reactant of high molecular weight and p-hydroxybenzal acetophenone as the unsaturated aromatic ketone.

The two reactants can be introduced in any desired proportion, but it is advantageous to use them in stoichiometric proportions, based on the active groups.

If the high molecular weight compound contains very many reactive groups, it is not necessary to react all these groups with the unsaturated ketone.

If the light-sensitive high molecular compounds of the present invention are exposed to the action of light, their physical and chemical properties are changed more or less quickly. It is believed that these changes are the result of a cross-linking reaction involving dimerization or polymerization at the double bonds of the unsaturated ketone constituent, but we do not want to be restricted to any particular theory with respect to this phenomenon. A very wide range of different light sources can be used, depending on the structure of the light-sensitive high molecular weight substances. Light having a high proportion of ultra-violet rays is particularly effective. The speed and the degree of cross-linking depend upon the amount of incident light and its wavelength, the amount of the unsaturated ketone in the polymer and also the molecular weight of the latter. The speed of the cross-linking caused by irradiation by light can be further increased by adding so-called sensitisers. Compounds from the classes comprising cyanines, triphenyl methane dyestuffs and dyestuffs of the benzanthrone, quinone or anthraquinone series can be used with particular advantage as such sensitisers. By means of these dyestuffs, the said reaction products are also sensitised with respect to visible light. The degree of cross-linking depends upon the period of incident light and the amount of unsaturated ketone in the polymer. It can therefore be varied in a convenient manner. These substances cross-linked by the irradiation by light become insoluble, harder and less sensitive to acids and alkali and to solvents.

The substances of high molecular weight prepared by the process according to the invention which are capable of being cross-linked by the action of light can be used for the production of coatings and sheet materials. It is also possible to produce moulded elements, the surface of which can be improved by exposure to light. They can be used with particular advantage as auxiliaries in the reproduction art, since exposure to light cross-links the high molecular layers at the places reached by the light, whereas the places not reached by light remain unchanged. By aftertreatment with a developer, the unexposed places can then be removed. It is a surprising fact that the process according to the invention gives very sharp contours in the reproduction art and permits the preparation of difficult reproductions.

In this connection, it is preferable to apply the light-sensitive compound of high molecular weight to a support in the form of a solution which dries thereon as a film. Any type of solvent can be used without the suitability of the products claimed being impaired by the nature of the solvent. For example, ketones, esters, alcohols, ethers, acid amides, hydrocarbons or their halogen or nitro derivatives or mixtures of these solvents can be used. As solvent mixtures, it is also possible to use mixtures which consist of one or more of such solvents and such substances which are not capable of dissolving the light-sensitive high molecular compounds.

The application of such solvents to a support can take place in any desired manner, for example, by spraying, brushing, casting or dipping. The centrifuging process has proved to be particularly suitable, since it is possible in this way to produce a particularly uniform film, the thickness of which can be easily reproduced.

As the support for the film, it is possible to use all the materials which are usual in the reproduction art, such as for example, zinc, copper, aluminum or magnesium, their oxides, the normal bimetallic and trimetallic plates, certain types of paper and film supports which are formed with a base of organic colloids, but also other substances, such as for example, glass or plastics.

The exposure of the films prepared in this manner, is carried out with the auxiliary means and light sources which are usual in the reproduction art. Lined, screen or half-tone negatives or diapositives can be used as the original.

After the exposure, those parts of the film which are not affected by the light are dissolved out by means of a solvent. For this purpose, it is possible to use the same solvents or solvent mixtures in which the light-sensitive high molecular compounds has previously been dissolved. In certain cases, however, the composition of such a developer may be different in order to produce certain effects, such as for example a particularly gentle or a particularly rapid development of the copy. Particular effects can also be obtained, for example by adding dyestuffs, a colouring of the copy taking place concurrently with the development. The copy thus obtained can also be subsequently dyed in order to be able to check it for any defects which may be present.

At this stage, the copy is ready for the conventional printing process. The advantage of the products of the invention as compared with those formerly used in the reproduction art is in that the actual film support can be coated a long time before being actually used, without it being possible to detect any decrease in the light sensitivity or in the developing capacity of the copying layer. It is known that this is only possible a short time beforehand, for example with plates which have been coated with chromium colloids. On the other hand, the copies prepared using the products of the invention are resistant to water, acid and alkali, whereby many new applications are provided, for example in the electrotechnical field, in which it is not possible to use chromium colloids, since they are swelled or even destroyed by water, acids or alkalis, even after exposure. Moreover, the copies prepared using the products of the invention are substantially more resistant to mechanical stresses than those which have been prepared with chromium colloids. This opens up many new fields of use.

The details of the present invention will become apparent to those skilled in the art from a consideration of the following working examples which are illustrative only and in no way to be construed as limiting.

*Example 1*

360 parts by weight of methyl methacrylate,
40 parts by weight of acrylic acid ethyl ester isocyanate,
400 parts by weight of butyl acetate, and
4 parts by weight of azodiisobutyric dinitrile are stirred in a nitrogen atmosphere for 20 hours at 95 to 100° C. After this time, polymerization is stopped by adding 4 parts by weight of anthraquinone. A solution of 64 parts by weight of p-hydroxybenzal acetophenone and 2 parts by weight of hexahydrodimethyl aniline in 982 parts by weight of butyl acetate is added quickly and while stirring with an internal temperature of 80° C. and the mixture is stirred at this temperature until no more isocyanate groups can be detected analytically. The light-sensitive lacquer solution thus obtained can be stored as long as desired in the dark. With this solution, it is possible to apply lacquer layers to glass or metal foils, these layers bonding very satisfactory and being soluble in butyl acetate or cyclohexanone. However, if these layers are exposed for some time to the light of a xenon high pressure lamp, they have become insoluble in butyl acetate or cyclohexanone.

*Example 2*

280 parts by weight of methacrylic acid cyclohexyl ester,
120 parts by weight of acrylic acid ethyl ester isocyanate,
4 parts by weight of azodiisobutyric acid dinitrile, and
4 parts by weight of butyl acetate are stirred under a nitrogen atmosphere for 20 hours at 95 to 100° C. The polymerization is stopped after this time by adding 4 parts by weight of anthraquinone. A solution of 192 parts by weight of p-hydroxybenzal acetophenone and 3 parts by weight of hexahydrodimethyl aniline in 1380 parts by weight of butyl acetate are then quickly added at an internal temperature of 80° C. and the mixture is stirred at this temperature until isocyanate groups can no longer be detected analytically. The solution obtained can be stored in the dark indefinitely.

134 parts by weight of this solution are diluted with 48.2 parts by weight of butyl acetate in which 0.03 part by weight of crystal violet has been dissolved. If an aluminum foil is covered with a thin layer of the casting solution prepared in this manner and if this is exposed behind a stencil to a xenon high pressure lamp, those parts which have not been affected by the light can be washed out with cyclohexanone or butyl acetate, while those parts on which the light has taken effect have become insoluble and thus represent a reproduction of the stencil with sharp contours.

*Example 3*

10 g. of a reaction product of hexanetriol and an excess of toluylene diisocyanate with 15.4% of free isocyanate groups are dissolved in 26 g. of cyclohexanone. At 80° C., 8.5 g. of p-hydroxybenzal acetophenone dissolved in 26 g. of cyclohexane are incorporated into this solution by stirring. Stirring is continued at 80° C. until isocyanate groups can no longer be detected analytically.

Example 4

4.4 g. of polyvinyl alcohol are dissolved at approximately 100° C. in 83 g. of formamide. 18.8 g. of p-isocyanatobenzal acetophenone are incorporated into this solution at 60° C. by stirring and the reaction mass is thereafter diluted with 170 g. of cyclohexanone. After approximately 30 minutes, the mixture is heated for a short time at 120° C. The result is a clear solution, which becomes slightly cloudy on cooling. It is filtered and the reaction product is isolated by stirring the filtrate into methanol. The product can easily be purified by dissolving and reprecipitating from acetone methanol. From a solution in acetone or cyclohexanone, it is possible to produce films which provide a surprisingly sensitive copying layer.

Example 5

280 parts by weight of β-isocyanato ethyl methacrylate are copolymerized under the conditions indicated in Example 2 with 120 parts by weight of styrene in 400 parts by weight of butylacetate with the aid of 4 parts by weight of azodiisobutyric acid dinitrile. In this way, a 50% solution of the copolymer in butyl acetate is obtained and this is reacted at 80° C. with 410 parts by weight of p-hydroxybenzal acetophenone which is dissolved in 1300 parts by weight of butyl acetate.

This solution is diluted to a solid content of 4% by adding butyl acetate and centrifuged on to the oxide layer of an anodised aluminum foil. The light sensitive layer applied in this manner is now exposed through an original (lined, half-tone or screen negative) with a carbon arc lamp for about 4 minutes at 30,000 Lux. Thereafter, those parts of the plastic layer which have not been exposed can be dissolved out with a solvent such as cyclohexanone, methyl ethyl ketone, butyl acetate or methyl glycol acetate, while the parts which have been exposed are not affected by these solvents. The oxide foundation exposed by this development is then made hydrophilic by one of the mordants usual in the rotaprinting practice and the copy is then ready for printing. Since the exposure has been made through a negative, the copy is positive. With this copy, that is to say, the copy prepared in a negative process, it is possible to produce originals which otherwise are only available by the positive process. Instead of anodically treated metal, it is of course also possible to choose any other metal support, for example, the grained zinc plates usual in the offset printing industry are particularly advantageous.

Example 6

4.4 parts by weight of polyvinyl alcohol are reacted with 10 parts by weight of p-isocyanatobenzal acetophenone in accordance with the conditions indicated in Example 4. From the material which is dissolved and reprecipitated, there is prepared a subsatntially 2 to 10% solution in cyclohexanone, methyl glycol acetate or butyl acetate. A copper foil with a thickness of about 10 mm. is applied as a lining to a plastic. It is, however, also possible for such a copper layer to be applied electrolytically, for example to glass. The copper layer is then coated with the solution which has been obtained and exposed for example behind a line negative of an electric circuit diagram. After development, the copper foil is treated with iron chloride solution and in this way a copper image of the electric circuit diagram is obtained on plastic or glass. It is very easy in this way for example for conductors and switch elements to be applied to plastic supports.

Example 7

4.4 parts by weight of polyvinyl alcohol and 24 parts by weight of p-isocyanatobenzal acetophenone are reacted with one another according to the conditions indicated in Example 4. With the solution obtained in this way which is diluted to a solid content of 2 to 10%, it is, for example, possible to produce a bimetallic plate by a degreased copper plate being coated, exposed and developed and thereafter treated with a silver cyanide solution. In this way, a silver image is obtained on a copper base. It is instead also possible to cover it with other metals after development, for example, it can be chromium plated by the convention processes. On the other hand, it is also possible to coat a prepared copper-chromium-bimetallic plate to develop this as indicated above and to remove the exposed chromium with an acid or even galvanically.

Example 8

200 parts by weight of β-isocyanato ethyl methacrylate are copolymerized with 200 parts by weight of methacrylic acid dodecyl ester in accordance with the conditions indicated in Example 2. The copolymer obtained is reacted at 80° C. with 290 g. of p-hydroxybenzal acetophenone, which has been dissolved in 1000 parts by weight of butyl acetate. The solution thus obtained is preferably diluted as indicated above to 4% and it is possible to expose and develop a paper coated therewith, the surface of said paper being so prepared that it rejects deep colour after being moistened with water. In this way, there is directly obtained a paper positive if a negative has been used as original at the time of exposure.

Example 9

88 parts by weight of a copolymer which has been obtained by partial saponification of polyvinyl acetate and contains 44 parts by weight of polyvinyl alcohol, is reacted in accordance with the conditions indicated in Example 4 with 200 parts by weight of p-isocyanatobenzal acetophenone. A substantially 2 to 10% solution is prepared of the reaction product purified by dissolving and reprecipitating and it is coated on to a cellulose acetate film as film support, exposed and developed and then the exposed parts of the film support are treated with a solution of sodium hydroxide in dilute alcohol.

Example 10

13.0 parts by weight of dried starch are dissolved at 100° C. in 235 parts by weight of dry formamide. A solution of 20 parts by weight of p-isocyanatobenzal acetophenone in 50 parts by weight of dry cyclohexanone and 0.1 part by weight of hexahydrodimethyl aniline is slowly added in the course of 15 minutes to the solution, which has been cooled to 80° C. Thereafter, the mixture is stirred for a further hour at 80° C. and the reaction product is then precipitated with methanol. The yellow reaction product is formed as flakes and is dissolved in cyclohexanone. A 4% solution of the reaction product in cyclohexanone is coated on to an anodised aluminum foil and dried thereon to form a film. Using this light sensitive layer, it is possible by exposure to produce copies which are characterized by a high mechanical strength.

Example 11

30 parts by weight of β-isocyanatoethyl methacrylate are copolymerized with 20 parts by weight of cyclohexyl methacrylate in 150 parts by weight of cyclohexanone as a solvent in the presence of 0.5 part by weight of azodiisobutyric acid dinitrile for 15 hours at 80° C. under a nitrogen atmosphere. The polymerization is stopped after this time by adding 0.5 part by weight of anthraquinone. A solution of 43.2 parts by weight of m-aminobenzal acetophenone and 0.5 part by weight of hexahydrodimethyl aniline in 360 parts by weight of cyclohexanone are then slowly added at a temperature of 80° C. while stirring.

A solution of the photo sensitive product thus obtained is diluted to reach a solid content of 4% with the aid of cyclohexanone. A copper foil is applied as a lining to a plastic and the copper layer is then coated with the above solution. The light sensitive lacquer is now exposed through a lined negative of an electric circuit diagram for about 4 minutes at 30,000 Lux. Thereafter, those parts of the lacquer which have not been exposed can be dissolved out with a solvent such as cyclohexanone or methyl glycol acetate. After development the copper foil is treated with iron chloride solution and in this way a copper image of the electric circuit diagram is obtained.

*Example 12*

50 parts by weight of β-isocyanatoethyl methacrylate are polymerized in 150 parts by weight of cyclohexanone in the presence of 0.5 part by weight of azodiisobutyric acid dinitrile for 11 hours at 80° C. Thereafter, 0.5 part by weight of anthraquinone are added. The polymer obtained is reacted at 80° C. with m-aminobenzal acetophenone and 1 part by weight of hexahydro-dimethyl aniline which has been dissolved in 250 parts by weight of cyclohexanone over a period of 3 hours.

The solution thus obtained is diluted to 4% with cyclohexanone, it is, for example, possible to produce a bimetallic plate by a degreased copper plate being coated, exposed and developed and, thereafter, treated with a silver cyanide solution. In this way, a silver image is obtained on a copper base. It is, instead, also possible to cover it with other metals after development, for example, it can be chromium plated by the convention processes.

*Example 13*

6.2 parts by weight of glycol are heated with 29 parts by weight of m,m'-diisocyanato-benzal acetophenone in the presence of 0.1 part of hexahydrodimethyl aniline in 250 parts by weight of cyclohexanone at 80° C. for 5 hours. The solution thus obtained is diluted to 4% with cyclohexanone. With this solution grained zinc plates can be coated and then exposed through an original (lined, half-tone or screen negative). Thereafter, those parts which have not been exposed can be dissolved out with a solvent such as cyclohexanone or methyl glycol acetate. The positive copy is now ready for printing, it is especially useful for the offset printing industry. The photo sensitive layer is characterized by a high life time.

Obviously many modifications and variations of the invention, as hereinbefore set forth, may be made without departing from the spirit and scope thereof and therefore only such limitations should be imposed as are indicated in the appended claims.

What is claimed is:

1. A method for making a light-sensitive compound which comprises reacting a member selected from the group consisting of gelatin, cellulose and synthetic resinous organic compounds having at least one group selected from the class consisting of —NCO groups and groups reactive with —NCO groups containing reactive hydrogen as determined by the Zerewitinoff method and a ketone having a phenyl radical and a styryl radical joined by a ketone group, said ketone having at least one group selected from the class consisting of an —NCO group and a group reactive with —NCO groups containing reactive hydrogen as determined by the Zerewitinoff method attached to an aromatic ring with the proviso that said ketone contains a group containing reactive hydrogen when said organic compound contains an —NCO group and said ketone contains an —NCO group when said organic compound contains a group containing reactive hydrogen.

2. The method of claim 1 wherein said ketone contains a group containing reactive hydrogen and said organic compound contains an —NCO group.

3. The method of claim 1 wherein said ketone contains an —NCO group and said organic compound contains a group containing reactive hydrogen.

4. The process of claim 1 wherein said organic compound is a copolymer of methyl methacrylate and acrylic acid ethyl ester isocyanate.

5. The process of claim 1 wherein the ketone is p-hydroxybenzal acetophenone.

6. A light-sensitive high molecular compound which is obtained by a process which comprises reacting polyvinyl alcohol and p-isocyanatobenzal acetophenone in substantially chemically equivalent amounts to form a light-sensitive high molecular product.

References Cited in the file of this patent

UNITED STATES PATENTS

| | | |
|---|---|---|
| 2,566,302 | Allen et al. | Sept. 4, 1951 |
| 2,680,732 | Martin | June 8, 1954 |
| 2,728,745 | Smith et al. | Dec. 27, 1955 |